Nov. 5, 1963

L. L. FIKE ETAL 3,109,553

RUPTURE DISC UNIT

Filed July 17, 1961

INVENTORS.
Lester L. Fike
BY Robert L. Solter

Hovey, Schmidt, Johnson & Hovey
ATTORNEYS.

United States Patent Office 3,109,553
Patented Nov. 5, 1963

3,109,553
RUPTURE DISC UNIT
Lester L. Fike, Blue Springs, and Robert L. Solter, Kansas City, Mo., assignors to Fike Metal Products Corp., Blue Springs, Mo., a corporation of Missouri
Filed July 17, 1961, Ser. No. 124,640
7 Claims. (Cl. 220—47)

This invention relates to rupture disc units, and more particularly, to units of the type which may be utilized for closing a chamber containing fluid under pressure, yet capable of being selectively opened to permit the flow of fluid past the unit. Rupture disc units have conventionally been employed for the protection of pressure vessels and other equipment. Such devices have normally included a dome-shaped, frangible diaphragm designed to rupture at a predetermined pressure differential, thereby relieving the excessive pressure.

A need has arisen for a means of containing fluid which may be at an extremely high pressure, and then to permit the flow of the fluid from the container when desired. Such flow is not for the protection of the container or equipment, but rather for use in any of a number of operations where an almost instantaneous flow of high velocity fluid is desirable. Usually the pressures involved are too high for presently available valving apparatus and conventional rupture discs are not suitable because they are designed to rupture at a predetermined pressure and not on control of an operator. Small variations in rupture pressures between individual discs and the inability to confine the fluid at the desired rupture pressure for a period of time prior to discharge, have rendered the conventional rupture discs unsuitable for these purposes.

Accordingly, it is the most important object of this invention to provide a rupture disc unit capable of withstanding high pressures for indefinite periods of time, yet capable of being ruptured under the control of an operator to permit the flow of fluid past the unit when desired.

Another important object of this invention is the provision of a rupture unit capable of permitting an almost instantaneous release of high pressure fluid from a storage receptacle therefor.

In connection with the foregoing object, an equally important object of the present invention is the provision in such a unit of a member capable of rupturing along predetermined lines to allow for substantially uniform flow of fluid through the member upon rupture thereof.

Still a further object of this invention is the provision of explosive means on the rupture unit for selectively effecting the rupture of the unit member thereby permitting the operator to be at a safe distance from the unit at the time of rupture of the latter.

Yet another object of the present invention is the provision of means to effect the initial rupture of the member substantially at the center thereof to insure uniform breaking and bending of the member to effect more complete opening of the chamber containing the high pressure fluid.

Figure 1:
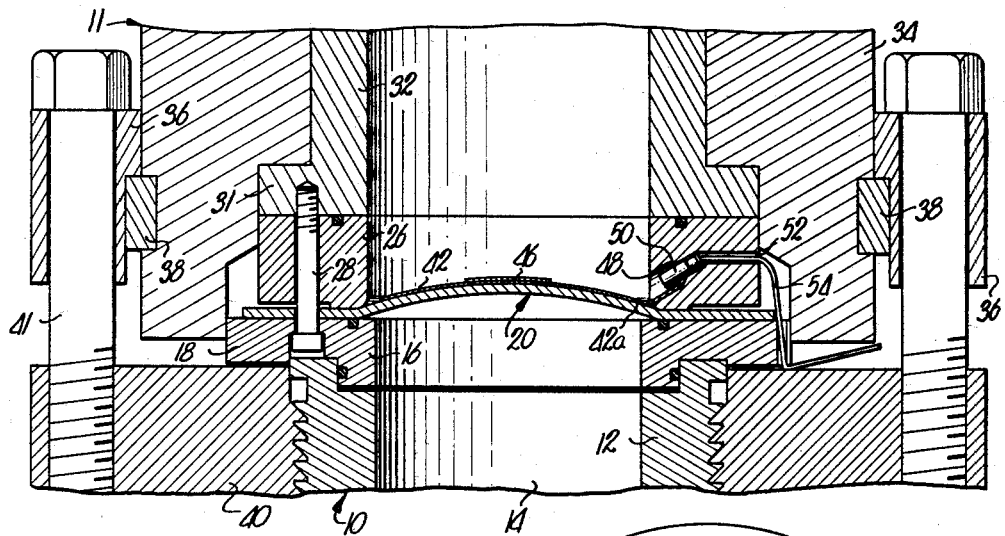
FIGURE 1 is a fragmentary, vertical, cross-sectional view of a rupture disc unit made pursuant to the present invention and including a disc member operably positioned within a suitable flange structure adapted to be mounted on a pressure chamber.
Figure 2:
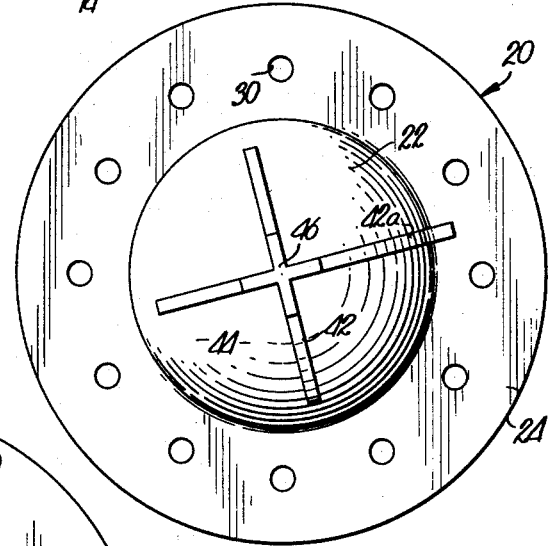
FIG. 2 is a top plan view of the disc member per se.
Figure 3:
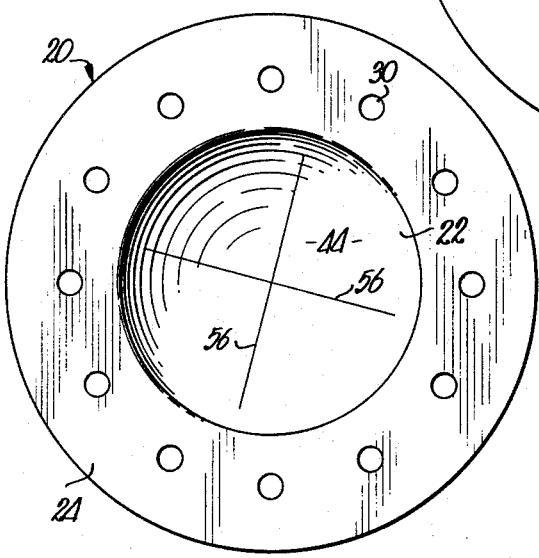
FIG. 3 is a bottom plan view of the member.

The rupture disc unit 10 includes flange structure 11 having a nipple 12 adapted for connection with a high pressure fluid-containing vessel (not shown) and has a central bore 14 in communication with the vessel. A base ring 16, having an outwardly extending flange 18, overlies nipple 12 and provides a seat for a rupture member 20 of frangible material such as stainless steel or the like, and including a concavo-convex body 22 and integral, annular, outwardly extending, peripheral flange 24.

Member 20 is disposed with the flange 24 thereof complementally engaging flange 18 of ring 16 while the convex surface of body 22 points away from nipple 12 and is in overlying, normal closing relationship to the bore 14 through nipple 12. A primary ring 26 is disposed over flange 24 and in engagement with the latter to hold member 20 in seated relationship upon ring 16. Bolt means 28, passing through base ring 16, each of a plurality of circumferentially spaced apertures 30 in flange 24 of member 20, correspondingly aligned apertures in ring 26 and extending into the outwardly extending, peripheral flange 31 of a tubular conduit 32 overlying ring 26, securely interconnect conduit 32, ring 26, member 20, and ring 16. Conduit 32 may exhaust to the atmosphere or communicate with a second vessel (not shown). A sleeve 34 circumscribes conduit 32 and ring 26, and is provided with a shoulder in complemental engagement with the outwardly extending flange 30 of conduit 32. An annular connector 36 is secured to sleeve 34 by ring structure 38 while annular retainer 40 threaded over the outer surface of nipple 12, is coupled to connector 36 by a series of bolts 41.

A plurality of strips 42 of explosive material are secured to the convex surface of body 22 in the form of a cross and thereby extend radially from the center of body 22 to divide the latter into substantially equal triangularly-shaped quadrants 44. The strips 42 join at the center of body 22 and a cross-shaped patch 46 of the explosive material, overlies the point of joinder of strips 42 and provides additional explosive material adjacent the center area of body 22. One strip 42a extends outwardly beyond body 22 and into a recess 48 within ring 26. It has been found that the desired results may be obtained by utilizing explosive strip manufactured and sold by the E. I. du Pont de Nemours Co., Wilmington, Delaware, under the trademark "EL 506D." The primary explosive constituent of this strip is believed to be pentaerythritoltetranitrate.

Detonator means 50, which may be a conventional #6 blasting cap or the like, is received within recess 48 and is operably coupled to the explosive strip 42a. An aperture 52 within and extending through ring 26 is in communication with recess 48 and provides means for the passage of electrical contact wires 54 which are operably coupled with the detonator means 50 and a suitable source of electrical impulse for use in energizing detonator means 50. The concave surface of body 22 is provided with two diametrically disposed, crossed score lines or creases therein presenting lines of weakness 56 which cross at the center of body 22 and are preferably disposed in direct opposition to and substantially coextensive in length with the strips 42 of explosive material on the upper surface of body 22. The creases 56 may be formed in body 22 by any suitable die stamping method but preferably prior to bulging of body 22.

In operation, member 20 is disposed in sealing relationship with chamber 14 which is filled with fluid at an extremely high pressure. When it is desired to release the fluid from chamber 14 into conduit 32, detonator means 50 is triggered by the induction of an electrical impulse through wires 54.

The explosion of detonator means 50 ignites explosive strip 42a and substantially simultaneously detonates the remaining strips 42. Concussion from the explosion of strips 42, results in rupture of the frangible body 22 of member 20 along lines or creases 56 and directly under the adjacent strips 42. The lines of weakness 56 on the under side of body 22 provide means for insuring breakage of body 22 along crossed, straight, clean lines. Patch 46 of additional explosive material, insures that the point of greatest explosive force and hence, the initial point of fracture will be located at the center of body 22. This facilitates the clean, straight-line breakage of body 22 into the triangularly-shaped quadrants and provides positive release of fluid from the pressure chamber with maximum flow of the fluid at the highest velocity thereof in a minimum of time after detonation of blasting cap 50. Fragmentation of the body 22 is also avoided by the provision of score lines.

The force of the pressure of the fluid within chamber 14, bends the quadrants 44 outwardly from the center of body 22 and it will be noted that ring 26 and conduit 32, are provided with internal diameters somewhat greater than the internal diameter of nipple 12 and base ring 16 to allow for the quadrants 44 to open fully when the same are bent upwardly by the force of the fluid rushing out of the pressure vessel therefor.

By the use of explosive material for breaking and cutting body 22 when it is desired to release the fluid from chamber 14, it is possible to safely maintain the fluid within the chamber 14 until the moment of release. Member 20 may be made of sufficiently strong material that there will be no danger of inadvertent rupturing thereof prior to the moment when controlled release of the fluid is desired. The placement of the crossed strips 42 dividing body 22 into quadrants, and also the utilization of lines of weakness in alignment with the strips of explosive material, insure that the fracture of body 22 will be substantially simultaneous throughout. This will allow for substantially instantaneous release of the pressurized fluid from chamber 14 across substantially the entire diameter of the opening.

Having thus described the invention, what is claimed as new and desired to be secured by Letters Patent is:

1. A rupture disc unit adapted to control the flow of fluid from a chamber comprising: a member disposed in fluid sealing relationship with respect to said chamber; an elongated strip of explosive material secured to the surface of said member; and means operably coupled with the explosive material strip for effecting the controlled detonation of the material whereby said member is caused to burst along the line of contact between the member and the material, thereby breaking said seal and permitting the flow of fluid from said container.

2. A rupture disc unit as set forth in claim 1, wherein said member is concavo-convex in configuration.

3. A rupture disc unit as set forth in claim 1 wherein is included a second elongated strip of explosive material crossed over the first strip at substantially the center of the member, said strips extending outwardly from the center of said member.

4. A rupture disc unit as set forth in claim 1, wherein said member is provided with a pair of mutually perpendicular lines of weakness adapting the same for rupture along said lines.

5. A rupture disc unit as set forth in claim 4, wherein said explosive means is substantially coextensive with and overlies said lines of weakness.

6. A rupture disc unit as set forth in claim 4, wherein said lines of weakness are in crossed relationship and cross substantially at the center of said member.

7. A rupture disc unit adapted to control the flow of fluid from a chamber having an opening comprising: a concavoconvex, frangible member provided with a contiguous, peripheral flange; clamping means for the flange mounting the member in sealed relation with said opening; lines of weakness joined at the center of said member and extending radially therefrom, said lines defining a plurality of substantially triangular, arcuate segments; strips of explosive material extending substantially collinearly with said lines of weakness and secured in overlying relationship to the latter; and means operably coupled with said explosive strips for detonating the latter, whereby detonation of said explosive strips breaks said member substantially along said lines of weakness and allows said segments to be bent away from said opening to permit the flow of fluid therefrom.

References Cited in the file of this patent

UNITED STATES PATENTS

| | | |
|---|---|---|
| 2,367,206 | Davis | Jan. 16, 1945 |
| 2,736,459 | Cockram | Feb. 28, 1956 |
| 2,808,114 | Parker | Oct. 1, 1957 |
| 3,005,573 | Dawson | Oct. 24, 1961 |